US012630283B2

(12) United States Patent
Hara et al.

(10) Patent No.: US 12,630,283 B2
(45) Date of Patent: May 19, 2026

(54) INFLATABLE STRUCTURE

(71) Applicant: SUBARU CORPORATION, Tokyo (JP)

(72) Inventors: Shunichiro Hara, Tokyo (JP); Takeshi Fukurose, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 2 days.

(21) Appl. No.: 19/196,195

(22) Filed: May 1, 2025

(65) Prior Publication Data

US 2025/0346342 A1 Nov. 13, 2025

(30) Foreign Application Priority Data

May 8, 2024 (JP) ................................. 2024-075575

(51) Int. Cl.
B64C 1/34 (2006.01)
B64C 3/30 (2006.01)
(52) U.S. Cl.
CPC . B64C 1/34 (2013.01); B64C 3/30 (2013.01)
(58) Field of Classification Search
CPC .... B64C 1/34; B64C 3/30; B64C 3/46; B64C 3/54; B64C 3/546; B64C 3/56
See application file for complete search history.

(56) References Cited

U.S. PATENT DOCUMENTS

| | | | | |
|---|---|---|---|---|
| 2,616,509 A | * | 11/1952 | Thomas | B64C 3/30 |
| | | | | 416/88 |
| 3,957,232 A | * | 5/1976 | Sebrell | B64C 3/30 |
| | | | | 428/188 |
| 4,725,021 A | * | 2/1988 | Priddy | B64C 3/30 |
| | | | | 244/219 |
| 5,244,169 A | * | 9/1993 | Brown | B64D 17/025 |
| | | | | 244/146 |
| 7,832,690 B1 | * | 11/2010 | Levine | B64C 3/54 |
| | | | | 244/218 |
| 8,141,301 B2 | * | 3/2012 | Brown | B64C 3/30 |
| | | | | 52/2.13 |
| 10,676,172 B1 | * | 6/2020 | Keavney | B64C 3/187 |
| 2009/0206196 A1 | * | 8/2009 | Parks | B64U 30/12 |
| | | | | 244/49 |
| 2018/0257760 A1 | * | 9/2018 | Lutke | B64U 10/25 |
| 2018/0370640 A1 | | 12/2018 | Toyama et al. | |

FOREIGN PATENT DOCUMENTS

JP 6566375 B 8/2019

* cited by examiner

*Primary Examiner* — Joshua D Huson
*Assistant Examiner* — Anna L. Gordon
(74) *Attorney, Agent, or Firm* — Finnegan, Henderson, Farabow, Garrett & Dunner, LLP

(57) ABSTRACT

An inflatable structure includes an inflatable bag and a telescopically extendable strut. The strut is disposed in the bag.

20 Claims, 7 Drawing Sheets

FUSELAGE SIDE

WINGTIP SIDE

FUSELAGE SIDE

WINGTIP SIDE

INFLATABLE STRUCTURE

CROSS-REFERENCE TO RELATED APPLICATIONS

The present application claims priority from Japanese Patent Application No. 2024-075575 filed on May 8, 2024, the entire contents of which are hereby incorporated by reference.

BACKGROUND OF THE INVENTION

Field of the Invention

The disclosure relates to an inflatable structure, which is capable of being inflated and deflated.

Description of Background Art

Japanese Patent No. 6566375 describes an aircraft (unmanned aircraft) including an inflatable balloon. The entire contents of this publication are incorporated herein by reference.

SUMMARY OF THE INVENTION

According to one aspect of the disclosure, an inflatable structure includes an inflatable bag, and a telescopically extendable strut disposed in the bag.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
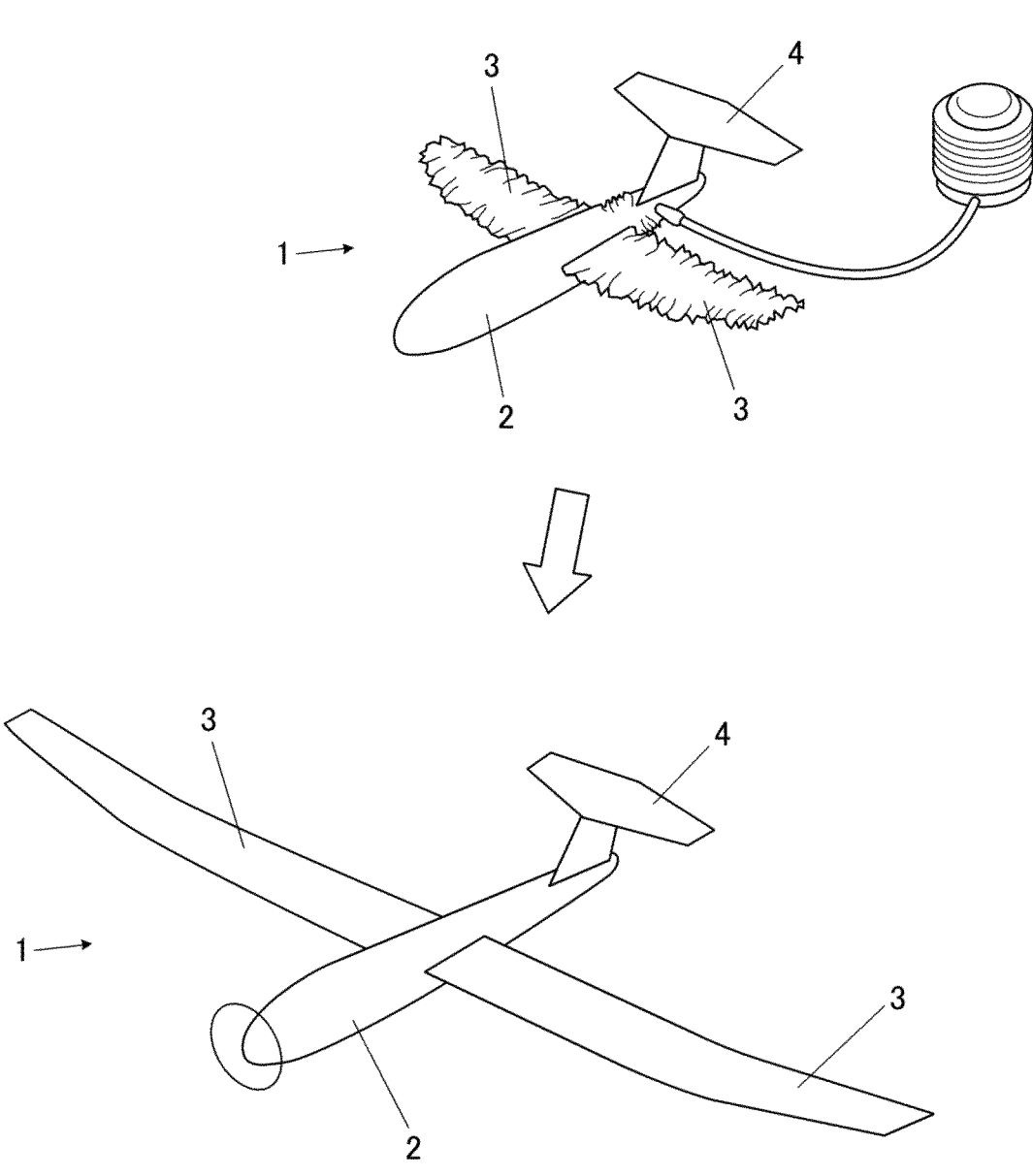
FIG. 1 illustrates an unmanned aircraft according to an embodiment.

Embodiments will now be described with reference to the accompanying drawings, wherein like reference numerals designate corresponding or identical elements throughout the various drawings.

Configuration of Unmanned Aircraft

FIG. 1 illustrates an unmanned aircraft 1 according to an embodiment.

As illustrated in FIG. 1, the unmanned aircraft 1 is configured to take a deflated state (first state) of being deflated to be small and an inflated state (second state) of being inflated by taking in the air.

The unmanned aircraft 1 is, for example, a fixed-wing aircraft including a fuselage 2, two main wings 3, and an empennage 4. In the unmanned aircraft 1 of this embodiment, the two main wings 3 are inflated and deflated by the air.

Structure of Main Wing

Figure 2:
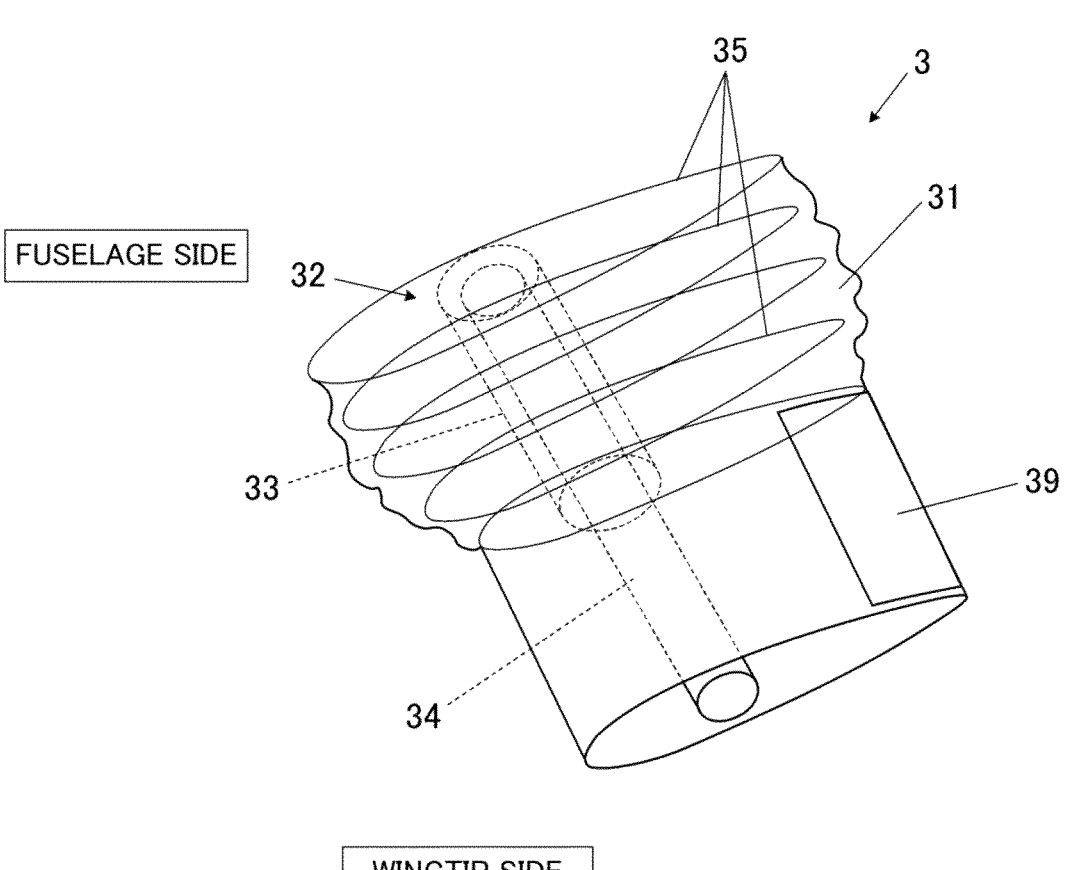
FIG. 2 is a diagram for explaining the structure of each main wing according to the embodiment.

FIG. 2 is a diagram for explaining the structure of each main wing 3. Although FIG. 2 illustrates the main wing 3 having a control surface 39, the main wing 3 may not have the control surface 39.

The main wing 3 is an example of the inflatable structure according to the disclosure and inflated by air injection and deflated by air release. In the unmanned aircraft 1 of this embodiment, the two main wings 3 are inflated and deflated together with the fuselage 2.

For example, as illustrated in FIG. 2, each main wing 3 includes a bag 31 as a skin member, a spar 32 that supports the bag 31, and ribs 35.

In this embodiment, the unmanned aircraft 1 is a single body by the bags 31 coupling the main wings 3 to the fuselage 2 to make the insides of the main wings 3 communicate with the inside of the fuselage 2. The material of the bags 31 is not limited as far as it is stretchable and airtight and therefore may be a material that is lightweight and hardly broken. Each bag 31 has an air injection port (not illustrated) that makes the inside and the outside communicate with one another. The bag 31 is inflated when the air is injected through the air injection port and deflated when the air is released through the air injection port.

The spar 32 is an example of a strut according to the disclosure and disposed in the bag 31. The spar 32 is configured to be telescopically extended and retracted along a wingspan direction (span direction) of the main wing 3. For example, the spar 32 includes a cylinder 33 disposed at the base end (fuselage 2 side) of the main wing 3, and a rod 34 supported by the cylinder 33 to go in and out along the wingspan direction.

The spar 32 is coupled to the air injection port so that the air injected into the bag 31 is first injected into the base end of the cylinder 33 to push the rod 34.

The number of telescopic stages of the spar 32 is not limited, and therefore the spar 32 may be configured to be telescopically extended and retracted at multiple stages of three or more stages. The rod 34 may be biased to a direction in which the rod 34 is housed (retracted) in the cylinder 33.

The ribs 35 support the bag 31 in a predetermined wing shape in the inflated state. Each rib 35 is made of, for example, a metal plate, has a circular (or ring) shape corresponding to the outer edge of a wing's section approximately perpendicular to the wingspan direction of the main wing 3, and is joined to the bag 31 over approximately the entire circumference. If each rib 35 is plate-like, the rib 35 has holes (not illustrated) for weight reduction and ventilation. The ribs 35 are fixed to the inner surface of the bag 31. The rib 35 closest to the fuselage 2 is fixed to the cylinder 33 or the rod 34. Instead of (or together with) the rib 35, the bag 31 may be fixed to the cylinder 33 or the rod 34.

The main wing 3 may have the control surface 39, such as an aileron. In this case, a part including the control surface 39 in an area in the wingspan direction is structured to be neither inflated nor deflated, and is fixed to the rod 34 via, for example, one or more of the ribs 35. This part, which is neither inflated nor deflated, may not be covered by the bag 31.

Figure 3A:
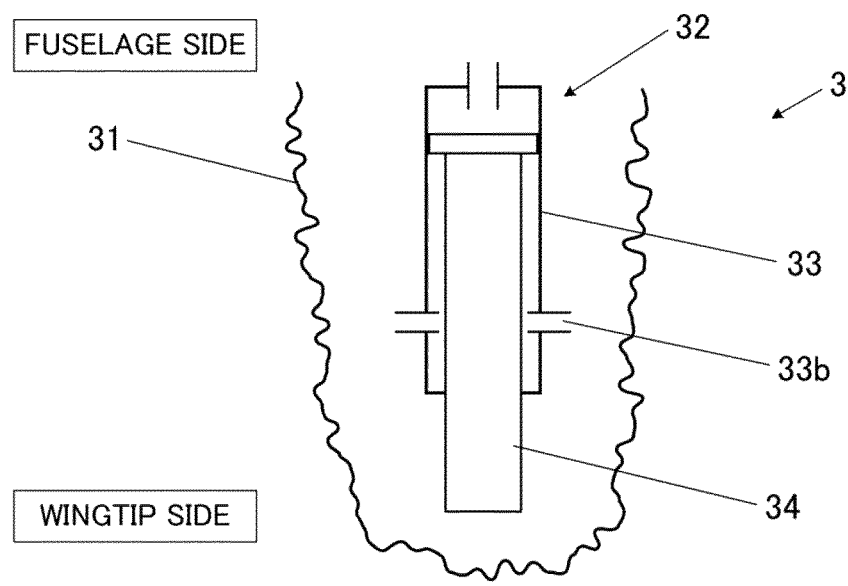
FIG. 3A illustrates the main wing in a deflated state.
Figure 3B:
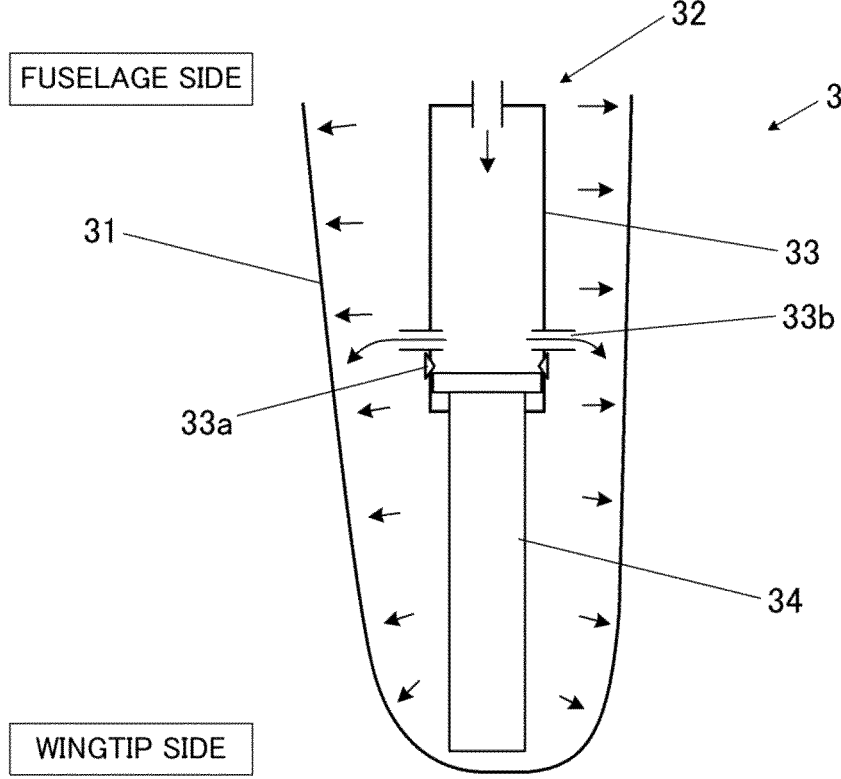
FIG. 3B illustrates the main wing in an inflated state in which a spar is extended.

FIG. 3A illustrates the main wing 3 in the deflated state, and FIG. 3B illustrates the main wing 3 in the inflated state in which the spar 32 is extended.

As illustrated in FIG. 3A, in the main wing 3 in the deflated state, the rod 34 is retracted and housed in the cylinder 33, and most of the air is released from the bag 31. When the air is injected into the main wing 3 (unmanned aircraft 1) in this state through the air injection port by, for example, a manual air pump, the air injected into the base end of the cylinder 33 pushes the rod 34 toward the wingtip side, thereby extending the rod 34.

As illustrated in FIG. 3B, when the rod 34 is fully extended toward the wingtip side, the rod 34 is engaged with an engagement member 33a of the cylinder 33, thereby being held in the extended state. The cylinder 33 has, on the pointed end side (wingtip side), a communication port 33b that makes the inside and the outside communicate with one another. When the end of the rod 34 on the base end side passes through the communication port 33b toward the pointed end side, the air pushing the rod 34 leaks from the cylinder 33 through the communication port 33b, thereby inflating the bag 31. With the extension of the spar 32, the ribs 35 are disposed at predetermined positions in the wingspan direction, and the bag 31 is supported in a predetermined wing shape. The air injection port is sealed in the state in which the bag 31 is fully inflated, so that the main wing 3 is held in the inflated state.

In order to deflate (fold) the inflated main wing 3, a procedure reversed from that for inflating the main wing 3 is performed. For example, the air injection port of the main wing 3 (unmanned aircraft 1) in the inflated state is opened to release the air to the outside, and the rod 34 engaged with the cylinder 33 is disengaged. Then, the rod 34 is housed in the cylinder 33 and accordingly the spar 32 is retracted, and the bag 31, from which the air has been released, can be folded. Thus, the unmanned aircraft 1 is in the deflated state in which the unmanned aircraft 1 is folded small.

Enhancement of Rigidity of Main Wing with Wires

Figure 4:
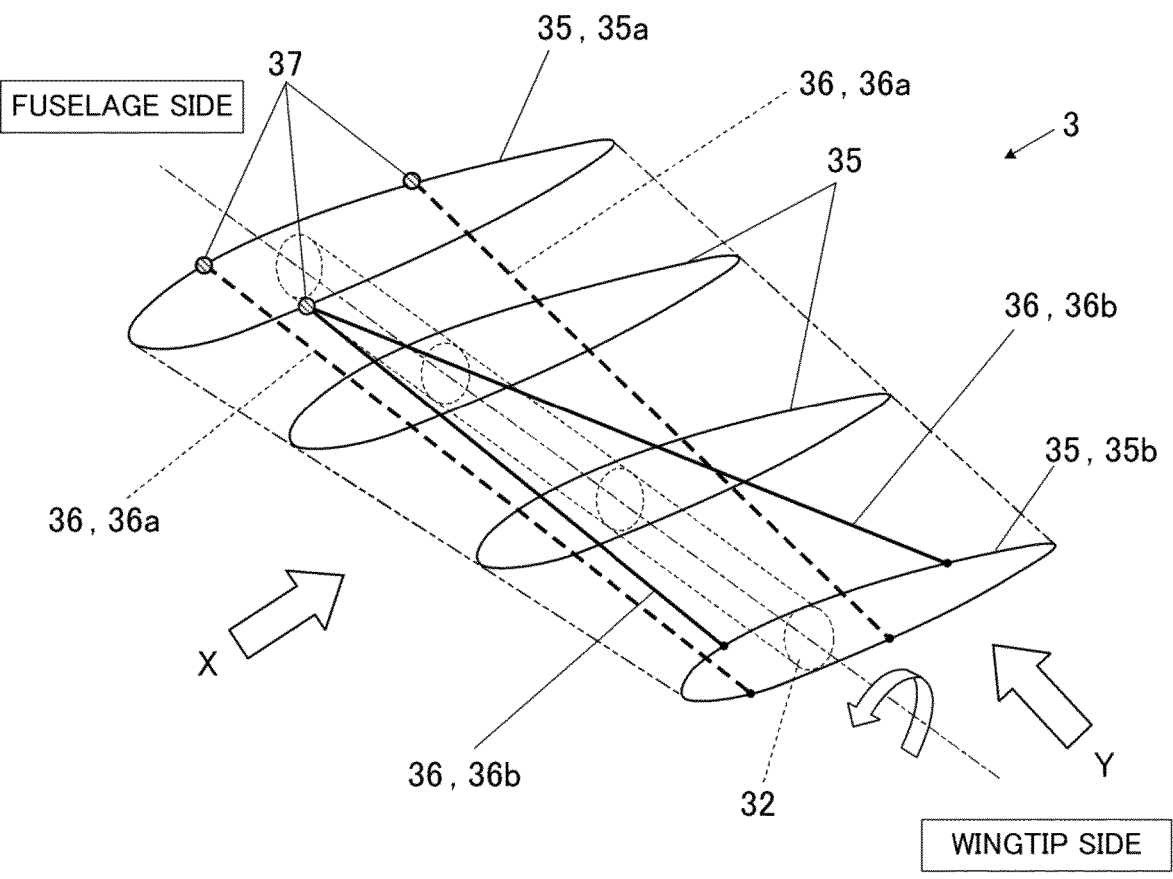
FIG. 4 is a perspective view of the main wing to illustrate wires stretched in the main wing.
Figure 5A:
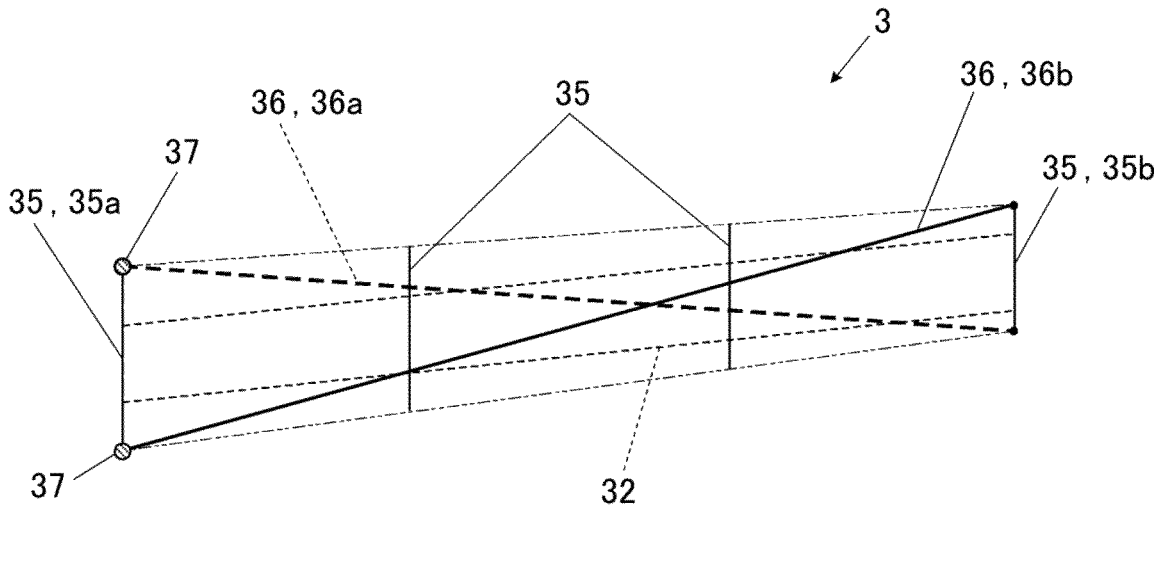
FIG. 5A is a diagram of the main wing as viewed in the direction of an arrow X in FIG. 4 to illustrate the wires stretched in the main wing.
Figure 5B:
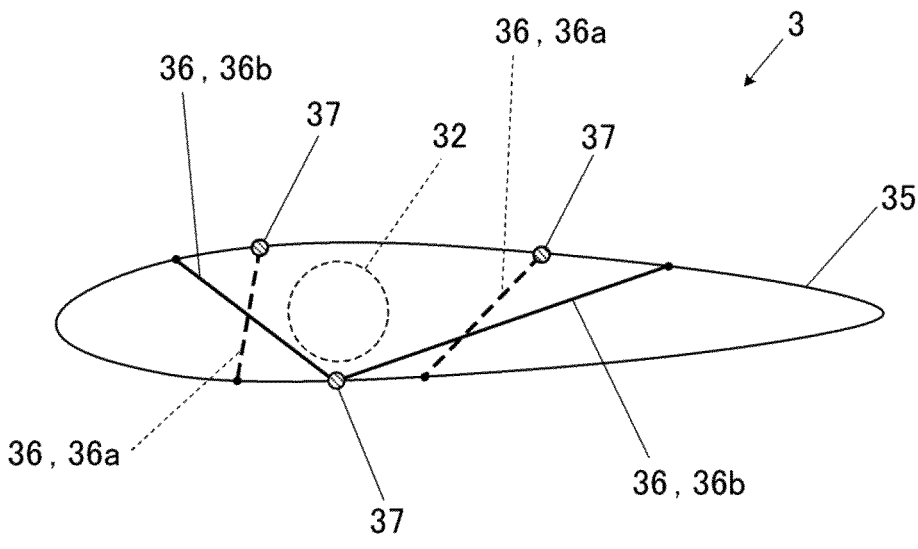
FIG. 5B is a diagram of the main wing as viewed in the direction of an arrow Y in FIG. 4 to illustrate the wires stretched in the main wing.

FIG. 4, FIG. 5A and FIG. 5B illustrate wires (tensile wires) 36 stretched in the main wing 3. Of these, FIG. 4 is a perspective view of the main wing 3, FIG. 5A is a diagram of the main wing 3 as viewed in the direction of an arrow X in FIG. 4, and FIG. 5B is a diagram of the main wing 3 as viewed in the direction of an arrow Y in FIG. 4.

As illustrated in these figures, in the main wing 3, two or more wires 36 (four wires 36 in this embodiment) are stretched as an example. This ensures torsional rigidity around the spar 32. The wires 36 are inserted into holes (not illustrated) of the ribs 35. The holes are provided at positions corresponding to the stretched wires 36.

The wires 36 are stretched from the rib 35 closest to the fuselage 2, namely a rib 35a, to the rib 35 closest to the wingtip, namely a rib 35b. In this embodiment, of the four wires 36, two first wires 36a illustrated in FIG. 4 by thick dashed lines are stretched from the upper surface part of the rib 35a on the fuselage 2 side to the lower surface part of the rib 35b on the wingtip side. The remaining two wires 36, namely second wires 36b illustrated in FIG. 4 by thick solid lines, are stretched from the lower surface part of the rib 35a on the fuselage 2 side to the upper surface part of the rib 35b on the wingtip side. The two second wires 36b extend such that the distance between these increases from the fuselage

2 side to the wingtip side in plan view. The four wires 36 extend in directions intersecting the spar 32 and also intersecting one another.

The ends of the wires 36 on the wingtip side are directly fixed to the rib 35b on the wingtip side. The ends of the wires 36 on the fuselage 2 side are fixed to the rib 35a on the fuselage 2 side via reels (winders) 37 capable of automatic wounding.

When the main wing 3 changes from the deflated state to the inflated state, with the extension of the spar 32, the wires 36 are unwounded from the reels 37. In the inflated state, the wires 36 are stretched with tension in the main wing 3, namely tensioned. This can reduce deformation of the main wing 3. Since the wires 36 are pre-tensioned by air pressure in the main wing 3, the wires 36 can more appropriately exhibit rigidity. Since the wires 36 extend in the directions intersecting the spar 32, the main wing 3 can appropriately exhibit the torsional rigidity around the spar 32.

When the main wing 3 changes from the inflated state to the deflated state, with the retraction of the spar 32, the wires 36 are automatically wound by the reels 37. This can reduce sags of the wires 36 in the main wing 3, thereby reducing tangles of the wires 36.

For enhancement of the rigidity of the main wing 3, at least one wire 36 is stretched over a certain area in the wingspan direction.

Utilization of Wires for Control

The wires 36 may be utilized for controlling (operating) the main wing 3 by deforming the main wing 3 by their tension being controlled.

Figure 6A:
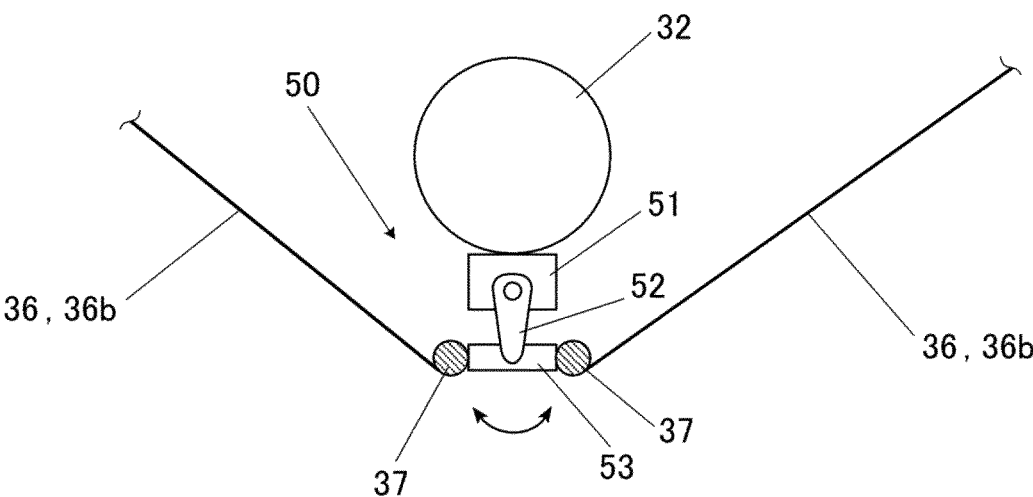
FIG. 6A illustrates a tension adjuster that adjusts tension of the wires.

In this case, for example, as illustrated in FIG. 6A, a tension adjuster 50 that adjusts the tension of the wires 36 is provided at the base end that supports the two second wires 36b.

In the tension adjuster 50, a servo motor 51 is disposed, for example, at the end of the main wing 3 on the fuselage 2 side. The output shaft of the servo motor 51 is coupled to a link 53 via a horn arm 52. To the link 53, two reels 37 that support the base ends of the two second wires 36b are fixed.

Figure 6B:
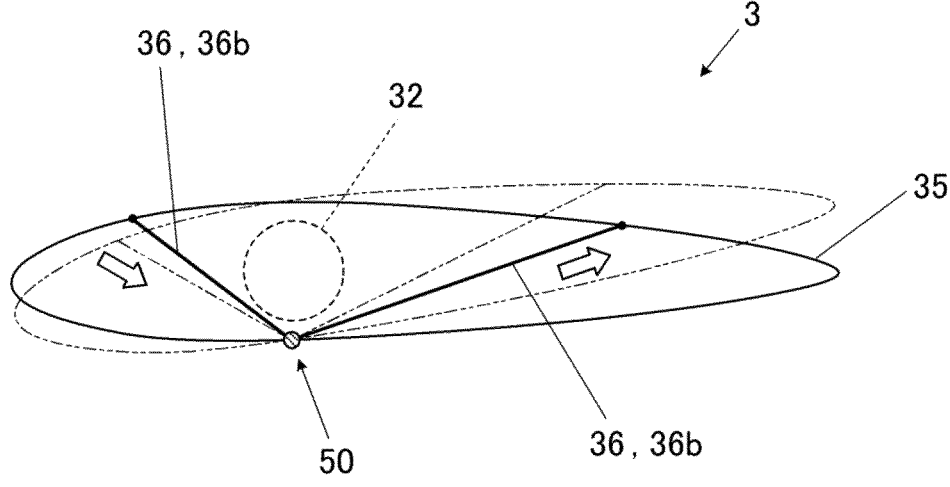
FIG. 6B illustrates the main wing that is torsionally deformed by the wires.

In the tension adjuster 50, the link 53 moves (swings) in a chord direction when driven by the servo motor 51. Then, the two reels 37 move in the chord direction, so that via the two second wires 36b, the main wing 3 is torsionally deformed around the spar 32 as illustrated in FIG. 6B. This, for example, generates a lift difference between the right and left main wings 3, so that the control in the roll direction can be performed.

Figure 7A:
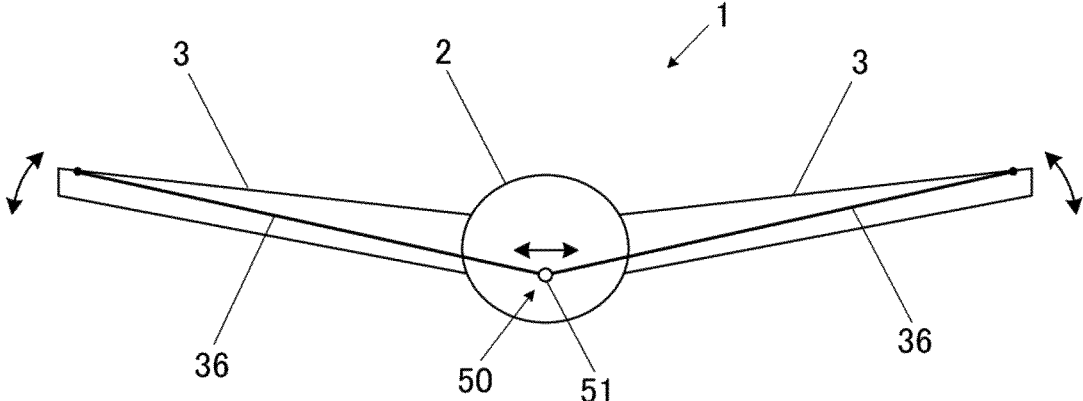
FIG. 7A illustrates an example in which the tension adjuster includes one servo motor for both main wings.

As illustrated in FIG. 7A, in the fuselage 2 at the center of the unmanned aircraft 1, one servo motor 51 may be disposed. In this case, the right and left main wings 3 (wires 36 thereof) are operated together by the one servo motor 51. Thus, the control by the wires 36 can be achieved with a relatively lightweight and simple configuration.

Figure 7B:
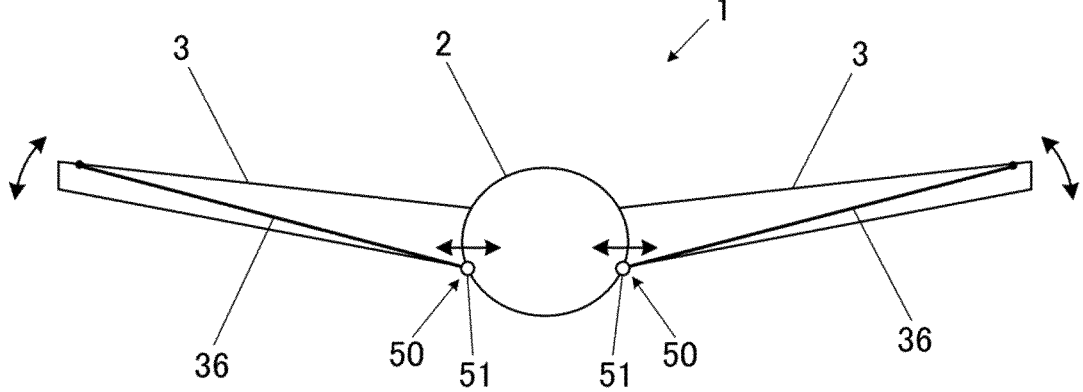
FIG. 7B illustrates another example in which the tension adjuster includes two servo motors for the respective main wings.

Alternatively, as illustrated in FIG. 7B, at the base ends of the right and left main wings 3, servo motors 51 that control the wires 36 of the respective main wings 3 may be disposed. With this configuration, the right and left main wings 3 can be controlled independently of one another. Thus, more complex operation control can be achieved.

As described above, according to this embodiment, the deflated state, in which the telescopic spar (strut) 32 is retracted and the bag 31 is deflated, and the inflated state, in which the spar 32 is extended and the bag 31 is inflated can be taken.

Thus, the main wing 3 can be inflated and deflated by being in the inflated state and the deflated state, respectively, and also in the inflated state, a certain level of rigidity can be ensured by the spar 32. Consequently, the unmanned aircraft 1 as a fixed-wing aircraft can be small and light-weight enough to be stored and carried by an individual, and also can fly for a longer period of time than a smaller multicopter, for example.

Furthermore, according to this embodiment, the wires (tensile wires) 36 are stretched in the bag 31 along the directions intersecting the extension direction of the spar 32.

This can appropriately enhance the torsional rigidity of the main wing 3 around the spar 32.

Furthermore, according to this embodiment, the reels 37 capable of automatically winding the wires 36 are disposed.

This can reduce sags of the wires 36 in the main wing 3, thereby reducing tangles of the wires 36.

Furthermore, according to this embodiment, the two second wires 36*b* are stretched from the fuselage 2 side to the pointed end side of the main wing 3 in the extension direction of the spar 32. As viewed in the chord direction (first direction) perpendicular to the extension direction of the spar 32, both the two second wires 36*b* extend from one side to the other side of the main wing 3 in the vertical direction (second direction), whereas as viewed in the vertical direction (second direction), the distance between the two second wires 36*b* increases from the fuselage 2 side to the pointed end side. The two second wires 36*b* are config-ured such that their ends on the fuselage 2 side are movable in the chord direction.

Therefore, by moving the ends of the two second wires 36*b* on the fuselage 2 side in the chord direction, in short, by the two second wires 36*b*, the main wing 3 can be torsionally deformed. This, for example, generates a lift difference between the right and left main wings 3, so that the control in the roll direction can be performed.

Furthermore, according to this embodiment, the spar 32 is extended by the air being injected, and the bag 31 is inflated by the air leaking from the spar 32 after extending the spar 32.

Thus, by extending the spar 32 and inflating the bag 31 successively, the main wing 3 can be inflated appropriately.

Others

Although an embodiment of the disclosure has been described above, the disclosure is not limited to the above embodiment.

For example, in the above embodiment, the main wing 3 is described as an example of the inflatable structure accord-ing to the disclosure. The configuration of the unmanned aircraft 1 other than the main wing 3 is not limited.

However, the control surface includes at least a rudder and an elevator. The fuselage 2 may be capable of being disas-sembled into multiple parts. The empennage 4 may be separable from the fuselage 2. Wiring to the tension adjuster 50, the control surface and so forth is laid in the bag 31 in advance. The medium that inflates the unmanned aircraft 1 is not limited to the air and therefore may be gas other than the air, for example.

Furthermore, the inflatable structure of the disclosure is not limited to a main wing of an aircraft and is applicable to a wide range of objects that are capable of being inflated and deflated for portability and desired to have a certain level of rigidity when inflated, such as tents and structures for emergencies.

In Japanese Patent No. 6566375, there is described an aircraft (unmanned aircraft) including an inflatable balloon. The balloon can be utilized as a buoyant body by being inflated and can be folded to be compact by being deflated when not in use.

However, the aircraft described in Japanese Patent No. 6566375 is a small multicopter, which is easy to carry but difficult to operate for a long period of time and has a small payload.

It is useful if a larger fixed-wing aircraft is capable of being stored compactly and carried easily.

However, it is difficult to configure structural compo-nents, such as main wings, of a fixed-wing aircraft to be inflated and deflated while maintaining a certain level of rigidity.

It is desirable to provide an inflatable structure capable of being inflated and deflated and also having a certain level of rigidity when inflated.

An aspect of the disclosure provides an inflatable struc-ture including an inflatable bag, and a telescopically extend-able strut disposed in the bag.

Obviously, numerous modifications and variations of the present invention are possible in light of the above teach-ings. It is therefore to be understood that within the scope of the appended claims, the invention may be practiced other-wise than as specifically described herein.

The invention claimed is:

1. An inflatable structure, comprising:
a bag configured to be inflated and deflated;
a strut positioned in the bag and comprising a plurality of telescopic stages configured to extend and retract tele-scopically in the bag such that the bag extends and retract in an extension direction of the strut; and
a plurality of tensile wires disposed in the bag and configured to be extended in a direction intersecting the extension direction of the strut, respectively,
wherein the plurality of tensile wire includes two tensile wires configured to be extended from one side to another side of the bag in the direction intersecting the extension direction of the strut such that each of the two tensile wires extends and intersects a first direction perpendicular to the extension direction and a second direction perpendicular to the extension direction and that a distance between the two tensile wires increases from the one side to the other side in the extension direction, and the two tensile wires have ends on the one side in the extension direction respectively such that the ends of the two tensile wires are movable in the first direction.

2. The inflatable structure according to claim 1, further comprising:
a reel configured to automatically wind the tensile wire.

3. The inflatable structure according to claim 2, wherein the plurality of telescopic stages in the strut is configured to be extended by air being injected, and the bag is configured to be inflated by the air leaking after extending the strut.

4. The inflatable structure according to claim 2, wherein the plurality of telescopic stages in the strut includes a cylinder and a rod housed in the cylinder and configured to be extended from and retracted in the cylinder.

5. The inflatable structure according to claim 2, wherein the plurality of tensile wires includes a plurality of second tensile wires configured to be extended in a direction inter-secting the extension direction of the strut respectively such that tortional rigidity of the bag around the strut is enhanced.

6. The inflatable structure according to claim 5, further comprising:
a tension adjuster comprising at least one servomotor and configured to adjust tension of the plurality of tensile wires such that the bag is torsionally deformed around the strut.

7. The inflatable structure according to claim 2, wherein the plurality of tensile wires includes a plurality of second wires such that the plurality of second wires is configured to be extended in a direction intersecting the extension direction of the strut respectively and intersecting the direction in which the two wires extend.

8. The inflatable structure according to claim 1, wherein the plurality of telescopic stages in the strut is configured to be extended by air being injected, and the bag is configured to be inflated by the air leaking after extending the strut.

9. The inflatable structure according to claim 8, wherein the plurality of telescopic stages in the strut includes a cylinder and a rod housed in the cylinder and configured to be extended from and retracted in the cylinder.

10. The inflatable structure according to claim 8, wherein the plurality of tensile wires includes a plurality of second tensile wires configured to be extended in a direction intersecting the extension direction of the strut respectively such that tortional rigidity of the bag around the strut is enhanced.

11. The inflatable structure according to claim 10, further comprising:
   a tension adjuster comprising at least one servomotor and configured to adjust tension of the plurality of tensile wires such that the bag is torsionally deformed around the strut.

12. The inflatable structure according to claim 8, wherein the plurality of tensile wires includes a plurality of second wires such that the plurality of second wires is configured to be extended in a direction intersecting the extension direction of the strut respectively and intersecting the direction in which the two wires extend.

13. The inflatable structure according to claim 1, wherein the plurality of telescopic stages in the strut includes a cylinder and a rod housed in the cylinder and configured to be extended from and retracted in the cylinder.

14. The inflatable structure according to claim 1, wherein the plurality of tensile wires includes a plurality of second tensile wires configured to be extended in a direction intersecting the extension direction of the strut respectively such that tortional rigidity of the bag around the strut is enhanced.

15. The inflatable structure according to claim 14, further comprising:
   a tension adjuster comprising at least one servomotor and configured to adjust tension of the plurality of tensile wires such that the bag is torsionally deformed around the strut.

16. The inflatable structure according to claim 1, wherein the plurality of tensile wires includes a plurality of second wires such that the plurality of second wires is configured to be extended in a direction intersecting the extension direction of the strut respectively and intersecting the direction in which the two wires extend.

17. The inflatable structure according to claim 16, further comprising:
   a tension adjuster comprising at least one servomotor and configured to adjust tension of the plurality of tensile wires such that the bag is torsionally deformed around the strut.

18. The inflatable structure according to claim 1, wherein the strut is configured to introduce air to the bag and inflate the bag with the air when the plurality of telescopic stages in the strut is extended.

19. A wing for an unmanned aircraft, comprising:
   a fuselage; and
   the inflatable structure of claim 1 connected to the fuselage.

20. An unmanned aircraft, comprising:
   a fuselage; and
   a plurality of wings connected to the fuselage and each comprising the inflatable structure of claim 1.

* * * * *